Nov. 16, 1937.    R. S. HATCH    2,099,014
METHOD OF PRODUCING VANILLIN FROM WASTE SULPHITE LIQUOR
Filed June 27, 1936
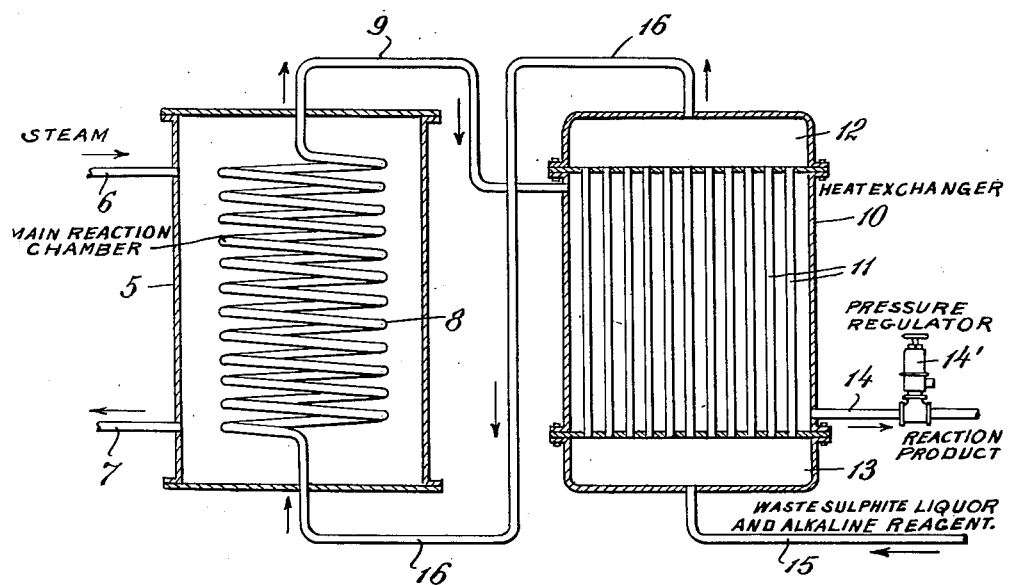
INVENTOR
Raymond S. Hatch
BY
ATTORNEY

UNITED STATES PATENT OFFICE 2,099,014

METHOD OF PRODUCING VANILLIN FROM WASTE SULPHITE LIQUOR

Raymond S. Hatch, Longview, Wash., assignor to Weyerhaeuser Timber Company, Tacoma, Wash., a corporation of Washington Application June 27, 1936, Serial No. 87,809

6 Claims. (Cl. 260—137)

This invention relates to the production and recovery of vanillin from waste sulphite liquor and particularly to improvements in the efficiency and economy of the reaction of waste sulphite liquor with alkaline agents to effect the commercial recovery of vanillin therefrom.

Since the announcement by Kürschner in 1928 of the possibility of producing vanillin from waste sulphite liquor, various investigators have from time to time studied the reaction under different conditions. A review of the literature on the subject, as well as a report of their own study is given by G. H. Tomlinson and Harold Hibbert in Journal of the American Chemical Society, Vol. 58, No. 2, pages 345 and 348.

It is well established that vanillin can be produced by heating waste sulphite liquor with an alkaline agent for extended periods at atmospheric or elevated pressures. Previously, however, relatively high concentrations of the alkaline agent (about 240 grams of caustic soda per liter of waste sulphite liquor) have been used, and the time of heating at atmospheric pressure has varied from 6 to 20 hours. At higher pressures, some reduction of the time of treatment has been effected, as for example, 4 hours at 6 atmospheres. The relatively high quantity of alkaline reagent, and particularly the heat consumption, has prevented any practical commercial development based upon the process because the yield of vanillin is low and the process is entirely too costly to permit operation on an economic basis. The high cost of equipment, particularly if substantial pressures are used, has also tended to prevent commercial application of the process.

It is the object of the present invention to afford a simplified and commercially practical procedure utilizing quantities of alkaline agents and heat sufficiently low to permit economic operation. It has been found that the optimum yield of vanillin is secured under these conditions, and that consequently commercial application of the process is feasible.

In carrying out the invention, the reacting materials are heated in such a way as to permit continuous introduction thereof with continuous withdrawal of the reaction products and the most effective application of heat during the reaction, with the minimum loss of heat through the withdrawal of products of the reaction. Furthermore, the alkaline agents are added in amounts relatively low as compared to the amounts heretofore considered necessary and sufficient only to ensure, at the end of the reaction, minimum hydrogen ion concentration or about pH 13. Any excess of alkali over the amount required is merely wasted. The temperature of the reaction is also relatively low, and the time particularly is limited so that useless application and waste of heat, which is comparatively expensive, is avoided. Pressures above atmospheric are utilized, but excessive pressures are avoided, and the apparatus necessary is thus simplified and is correspondingly inexpensive.

The invention will be better understood by reference to the following specification and the accompanying drawing, in which the figure is a diagrammatic illustration of an apparatus which may be employed practically in the operation of the process.

Referring to the drawing, 5 indicates the reaction chamber which may be supplied with a suitable heating agent, for example steam, through a pipe 6. The condensate and uncondensed steam may be withdrawn through the pipe 7. Since the temperature to be maintained is in the neighborhood of 200° C., the heating may be effected readily with steam at relatively low pressures. Within the reaction chamber 5 is a coil 8 to afford a heat transfer surface of relatively large size, through which the reacting materials are forced. As the reacting materials flow through the coil or coils and are subjected to heat by exchange with the steam in the reaction chamber, the desired reaction products escape through a pipe 9 to an exchanger 10 enclosing a series of tubes 11 terminating in chambers 12 and 13 at the ends of the exchanger. The reaction products surround the tubes 11 carrying the incoming materials which are thereby raised to a temperature approaching that attained in the coil 8. The length of the coil, or coils if more than one are used, and of the tubes 11, is such as to permit retention of the reaction materials in the heating zone for a period of approximately 15–30 minutes. The reaction products are withdrawn through a pipe 14, after which they may be subjected to treatment by known methods to extract the vanillin therefrom. A pressure relief valve 14' in the pipe 14 controls the pressure within the system. It should be set for a pressure slightly higher than the pressure of saturated steam at the temperature maintained.

The mixture of waste sulphite liquor with the required amount of alkaline reagent is introduced through a pipe 15 to the chamber 13 at one end of the exchanger 10, and passes through the tubes 11 to the chamber 12 at the other end of the exchanger. In this passage, the entering material absorbs heat from the reaction products, the latter escaping at relatively low temperatures while the incoming material is preheated to approximately the temperature of the reaction. The incoming material is delivered through a pipe 16 to the coil or coils 8 of the reaction chamber. The use of the heat exchanger avoids waste of heat and ensures the introduction of the incoming material to the reaction chamber at a temperature at which it will readily absorb additional heat to effect the desired reaction in the shortest practicable period.

For the purpose of the invention I may employ as an alkaline agent, the hydroxides of the alkali metals, preferably sodium or potassium hydroxide. The amount of reagent employed is the minimum amount which will maintain hydrogen ion concentration of substantially pH 13 at the end of the reaction. From 35 to 40 grams per liter of sodium hydroxide is usually sufficient, or the equivalent amount of potassium hydroxide. The best results have been obtained at 200° C. with about 40 grams per liter of sodium hydroxide in the waste liquor. The mixture thus prepared is pumped or otherwise forced through the apparatus previously described, being introduced through the pipe 15. I have found that a pressure of approximately 215 pounds is satisfactory. Temperatures between 180° and 220° C. are desirable. Obviously, the amount of the alkaline agent and the temperature and pressure may be varied, but within the limits mentioned the optimum yield of vanillin is obtained. Substantially no gas is formed during the reaction, and therefore the pressure within the system will be that which corresponds to saturated steam pressure at the operating temperature.

As an example of the practical application of the invention, I may add 35-40 grams per liter of sodium hydroxide or the equivalent amount of potassium hydroxide. The mixture is introduced at a pressure of approximately 215 pounds to the apparatus hereinbefore described, and heated to a temperature of about 200° C., the operation being regulated so that the reacting materials are heated for a period of about 15 to 30 minutes. The reaction product escapes, after passing through the heat exchanger, at relatively low temperature and may be subjected thereafter to suitable treatment to recover the vanillin therefrom.

The process as described is commercially practicable and capable of producing vanillin from waste sulphite liquor on an economic and profitable basis. So far as I am aware, none of the processes heretofore suggested has produced comparable yields at costs which permit commercial development and practical application of the reaction of waste sulphite liquor with alkaline reagents.

Various changes may be made in the details of procedure and in the apparatus employed therein without departing from the invention or sacrificing any of the advantages thereof.

I claim:

1. The process of producing vanillin from waste sulphite liquor which comprises adding to the liquor an alkaline agent in an amount sufficient to afford at the conclusion of the reaction a pH of about 13, and heating the mixture to a temperature of from 180° C. to 220° C. for a period not exceeding thirty minutes.

2. The process of producing vanillin from waste sulphite liquor which comprises adding to the liquor an alkaline agent in an amount sufficient to afford at the conclusion of the reaction a pH of about 13, and heating the mixture at a temperature of approximately 200° C. for a period of about fifteen minutes.

3. The process of producing vanillin from waste sulphite liquor which comprises adding to the liquor an alkaline agent in an amount sufficient to afford at the conclusion of the reaction a pH of about 13, and heating the mixture to a temperature of approximately 200° C. for a period of about fifteen minutes while it is maintained under a pressure of about 215 pounds per square inch.

4. The process of producing vanillin from waste sulphite liquor which comprises adding to the liquor an alkaline agent in an amount sufficient to afford at the conclusion of the reaction a pH of about 13, and heating the mixture to a temperature of from about 180° C. to 220° C. for a period of from about fifteen to thirty minutes, while it is under a pressure of about 215 pounds per square inch.

5. The process of producing vanillin from waste sulphite liquor which comprises adding to the liquor an alkaline agent in an amount sufficient to afford at the conclusion of the reaction a pH of about 13, heating the mixture to a temperature of approximately 200° C. for a period of about 15 minutes, and immediately thereafter cooling the product.

6. The process of producing vanillin from waste sulphite liquor which comprises adding to the liquor an alkaline agent in an amount sufficient to afford at the conclusion of the reaction a pH of about 13, heating the mixture to a temperature of from 180° C. to 220° C. for a period not exceeding thirty minutes, and immediately thereafter cooling the product.

RAYMOND S. HATCH.